United States Patent [19]
Petrik

[11] 3,773,342
[45] Nov. 20, 1973

[54] TOWABLE SLEIGHS

[76] Inventor: Stephen Petrik, 40 Godstone Rd., Willowdale, Ontario, Canada

[22] Filed: Oct. 14, 1971

[21] Appl. No.: 189,378

[52] U.S. Cl. ............................................ 280/12 H
[51] Int. Cl. ............................................ B62b 13/00
[58] Field of Search .................... 280/18, 19, 12 R, 280/12 K, 12 KL, 24, 12 H; 9/310 B

[56] References Cited
UNITED STATES PATENTS

| | | | |
|---|---|---|---|
| 3,585,664 | 6/1971 | Thompson | 280/12 H |
| 3,394,944 | 7/1968 | Lowes | 280/12 R |
| 3,580,598 | 5/1971 | Pauw | 280/18 |
| 3,374,003 | 3/1968 | Fulsom | 280/18 |
| 2,139,513 | 12/1938 | Nelson | 280/18 |

FOREIGN PATENTS OR APPLICATIONS

| | | | |
|---|---|---|---|
| 1,004,487 | 9/1965 | Great Britain | 280/18 |
| 604,520 | 9/1960 | Canada | 280/12 B |

*Primary Examiner*—Robert R. Song
*Attorney*—Cecil C. Kent

[57] ABSTRACT

A sleigh consists of a somewhat elongated platform, the undersurface of which has three ribs disposed lengthwise; the side ribs converge rearwardly towards the middle rib which is lower than the side ribs. The undersurface curves upwards towards the edge and the upper surface has a pair of foot control sockets disposed over the curved undersurface with one socket outwardly of each side rib and intermediate of its length.

1 Claim, 6 Drawing Figures

PATENTED NOV 20 1973 3,773,342

INVENTOR.
STEPHEN PETRIK
BY
Atty

PATENTED NOV 20 1973 3,773,342

INVENTOR.
STEPHEN PETRIK

BY
Atty.

TOWABLE SLEIGHS

FIELD OF THE INVENTION

This invention relates to sleighs or sleds which may be towed behind a moving vehicle and has particular relation to sleighs which may be towed behind a vehicle such as a snowmobile or boat adapted to move at sufficient speed over snow or water, the sleigh being propelled through the medium of tow ropes secured at one end to the moving vehicle and held at the other end by the person standing on the sleigh.

PRIOR ART

With the advent of vehicles adapted to move rapidly over snow covered terrain, which vehicles commonly have tracks, attempts have been made to utilize skis in various forms for the purpose analogous to water skis.

It has been found that though skis can be towed to support a person behind a tracked vehicle travelling over a smooth terrain, any sudden change in the terrain with a corresponding attempt to change direction, causes the skier either to pitch forward or backward with serious risk of injury which is increased unless the skier is unable to effect instantaneous release of the tow ropes.

Hence, variations in the terrain over which such vehicles operate creates a problem of steering which is absent in water skiing where large smooth turns are all that is necessary for the skier (although the invention may with or without modification prove to have advantages as a towed water sleigh or sled also).

It is an object of the invention to provide a steerable sled or sleigh which can be towed behind a moving vehicle irrespective of the nature of the terra firma which sled supports a person who holds ropes attached to the vehicle.

It is a further object of the invention to provide a sleigh which can be steered with rapid change of direction by the person standing thereon.

SUMMARY OF THE INVENTION

The invention consists of a sled or sleigh of a somewhat elongated platform towed lengthwise, the under surface of the platform having a middle rib running lengthwise with a spaced apart rib on each side converging rearwardly; the middle rib is lower than the side ribs. The undersurface of the sled is curved downwards from the edge and the upper surface has a pair of spaced apart foot control sockets positioned above the curved undersurface, one to the outward side of each side rib and intermediate of its length.

With the foregoing in view, and such other or further purposes, advantages or novel features as may become apparent from consideration of this disclosure and specification, the present invention consists of the inventive concept which is comprised, embodied, embraced or included in the method, process, construction, composition, arrangement or combination of parts, or new use of any of the foregoing, herein exemplified in one or more specific embodiments of such concept, reference being had to the accompanying drawings in which.

In the drawings, like characters of reference designate similar parts in the several Figures.

DESCRIPTION OF PREFERRED EMBODIMENT

Figure 1:
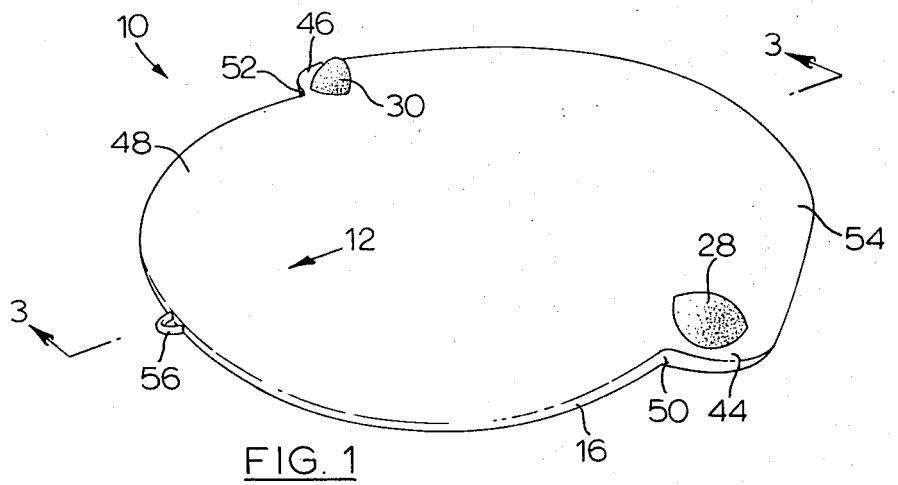
FIG. 1 is a perspective view of the upper surface of the sleigh.
Figure 2:
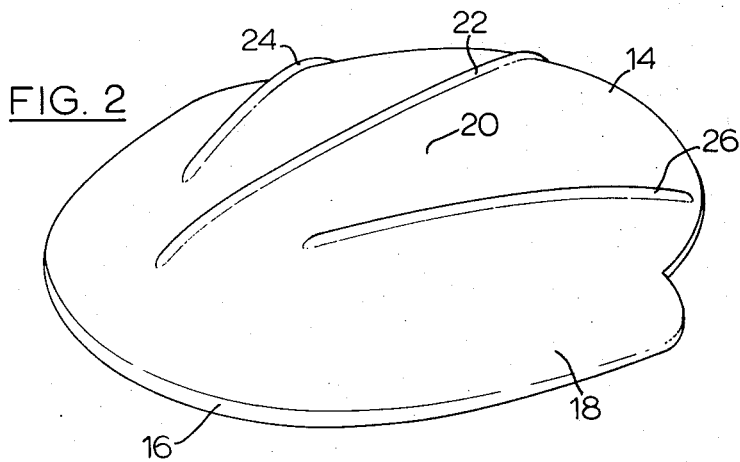
FIG. 2 is a perspective view of the lower surface of the sleigh.
Figure 3:
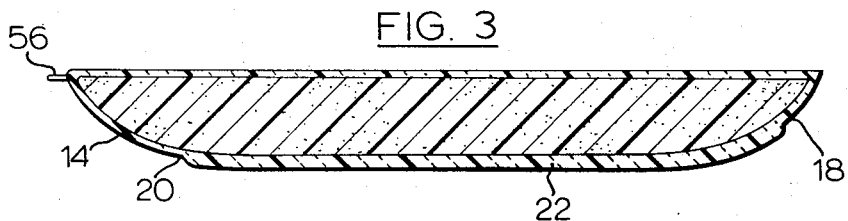
FIG. 3 is a section taken along the lines 3—3 of FIG. 1.
Figure 4:
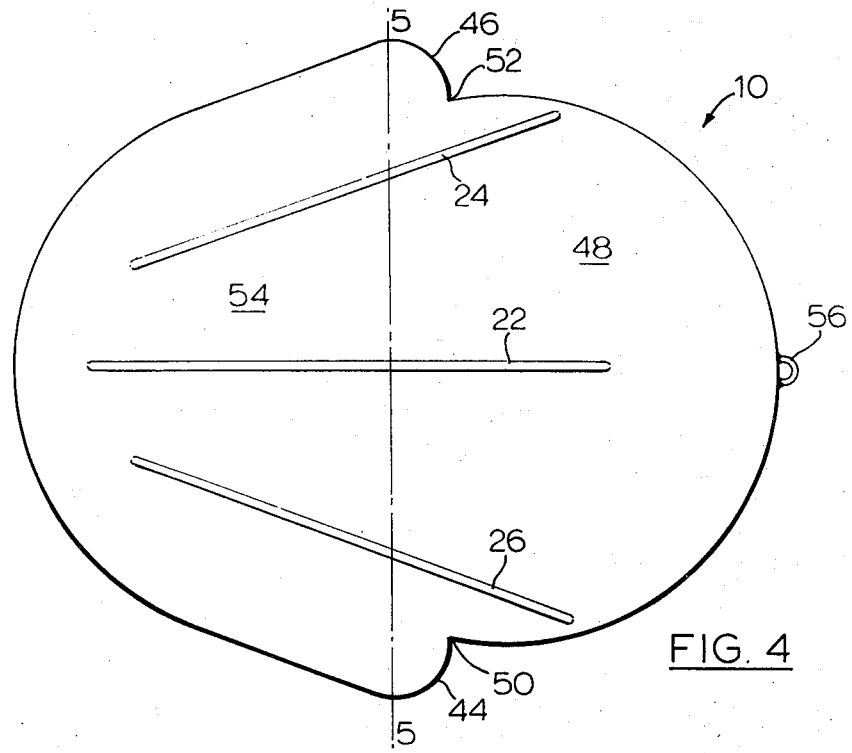
FIG. 4 is a plan view of the undersurface of the sleigh of FIG. 1.
Figure 6:
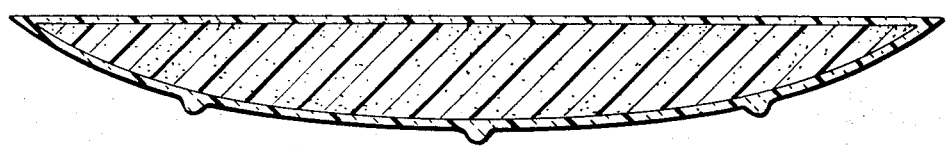
FIG. 6 is a transverse cross-section taken on the line 5—5 of FIG. 4.
Figure 5:
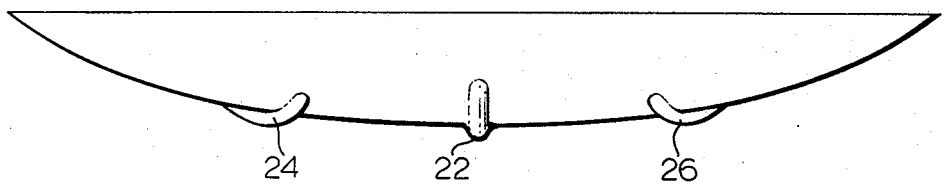
FIG. 5 is a rear elevation.

The sleigh shown in FIG. 1 and generally denoted by the numeral 10 has an upper wall 12, an under wall 14 and an integral edge or side wall 16 connecting the upper wall 12 to the under wall 14. The sleigh 10 is designed to travel in the direction of the arrow shown in FIG. 1 and its length may advantageously be somewhat greater than its width, a preferred ratio of length to width being 7 : 6. The surface of the under wall 14 adjacent to the side wall 16 is curved inward and downward as at 18, this being shown more particularly in FIGS. 2 and 3. The portion 20 of the under wall 14 inwards of its curved surface 18 may be slightly curved but preferably it is substantially planar as shown in FIG. 3.

A rib 22 is located lengthwise on the under wall 14, the rib 22 being substantially centrally disposed with respect to the breadth of the sleigh 10. The rib 22 should preferably extend from a point adjacent the rear of the side wall 16, across the adjacent curved surface 18 and along the planar portion 20, to terminate short of the forward part of the side wall 16.

Also on the planar portion 20 are a pair of side ribs 24 and 26 disposed one to each side of the central rib 22 and spaced therefrom. The side ribs 24 and 26 flare outwardly in the direction of travel of the sleigh 10. The side ribs 24 and 26 also are preferably somewhat shorter than the central rib 22. The central rib 22 is lower along its length than the side ribs 24 and 26. The upper wall 12 has a pair of spaced apart foot control sockets 28 and 30 which are shaped to accommodate the foot of a person standing on the sleigh 10. The sockets 28 and 30 are located over the curved undersurface 18 of the sleigh 10, the socket 28 being outward with respect to the side rib 24 and the socket 30 being outward with respect to the side rib 26; each socket 28 and 30 is intermediate of the length of the side ribs 24 and 26. Preferably the sockets 28 and 30 are located behind the transverse center line of the sleigh 10.

As mentioned above the length of the sleigh 10 is desirably somewhat greater than its width. A preferred form though is shown in FIG. 1, the upper wall 12 having ear formations 44 and 46 each containing respectively the sockets 28 and 30. Forward of the ear formations 44 and 46 the sleigh 10 has a substantially arcuate portion 48 the extremities of which form recesses 50 and 52 where they join the ears 44 and 46; rearward of the depressions 28 and 30 the sleigh 10 forms another arcuate portion 54. The front edge wall 16 has a ring 56 which provides for attachment of a tow line not shown.

The towed sleigh 10 supporting a person whose feet are positioned one to each of the sockets 28 and 30 to provide uniform pressure, will proceed directly forward supported substantially on the centrally disposed rib 22. However, if increased pressure is exerted in the socket 28 the sleigh 10 will tilt so that it rides on the main rib 22 and the diverging side rib 26 with the result that the sleigh 10 will move to the left of the arrow shown in FIG. 1. On the other hand if increased pressure is exerted in the socket 30 the sleigh 10 will tilt so that it rides on the main rib 22 and the other diverging side rib 24, the sleigh 10 then proceeding to the right of the arrow shown in FIG. 1.

Various modifications may be constructed or performed within the scope of the inventive concept disclosed. Therefore what has been set forth is intended to illustrate such concept and is not for the purpose of limiting protection to any herein particularly described embodiment thereof.

I claim:

1. A towed elongated platform having a forward end, towable by a snowmobile in a forward direction in relation to its length and steerable by a person standing thereon comprising hitch means attached to said forward end for attachment to said snowmobile, an upper wall, a lower wall, a side wall connecting said upper and lower wall, said lower wall having a central planar portion curving upwards towards said side wall, a pair of spaced apart side ribs diverging in the direction of travel of said platform, a spaced apart central rib intermediate of said spaced apart side ribs and extending lengthwise of the lower wall along said planar and curved surface, said central rib terminating ahead of said side ribs, the surface of said central rib being lower than said side ribs when the upper wall of said platform is horizontal, said upper wall having a pair of spaced apart sockets positioned above said curved surface of said lower wall and adapted to receive the feet of said person, said sockets being one to the outward side of each of said side ribs and intermediate the ends thereof.

* * * * *